United States Patent
Shim et al.

(10) Patent No.: US 11,843,688 B2
(45) Date of Patent: Dec. 12, 2023

(54) METHOD FOR DYNAMIC FEEDBACK CONTROL BASED ON HOMOMORPHIC ENCRYPTION WHICH CARRIES OUT UNLIMITED ARITHMETIC OPERATIONS WITHOUT BOOTSTRAPPING

(71) Applicant: Seoul National University R&DB Foundation, Seoul (KR)

(72) Inventors: Hyungbo Shim, Seoul (KR); Junsoo Kim, Seoul (KR)

(73) Assignee: Seoul National University R&DBFoundation, Seoul (KR)

( * ) Notice: Subject to any disclaimer, the term of this patent is extended or adjusted under 35 U.S.C. 154(b) by 392 days.

(21) Appl. No.: 17/382,599

(22) Filed: Jul. 22, 2021

(65) Prior Publication Data

US 2021/0351914 A1  Nov. 11, 2021

Related U.S. Application Data

(63) Continuation-in-part of application No. PCT/KR2020/008097, filed on Jun. 23, 2020.

(30) Foreign Application Priority Data

Oct. 10, 2019  (KR) .................. 10-2019-0125503

(51) Int. Cl.
*H04L 9/00* (2022.01)
*H04L 9/08* (2006.01)
*G06F 17/16* (2006.01)

(52) U.S. Cl.
CPC .............. *H04L 9/008* (2013.01); *G06F 17/16* (2013.01)

(58) Field of Classification Search
CPC .......... H04L 9/008; H04L 9/088; G06F 17/16
See application file for complete search history.

(56) References Cited

U.S. PATENT DOCUMENTS 10,298,385 B2  5/2019  Khedr et al.
10,644,877 B2  5/2020  Khedr et al.
(Continued)

FOREIGN PATENT DOCUMENTS

| EP | 2677680 A1 | 12/2013 |
|---|---|---|
| KR | 10-1919940 B1 | 11/2018 |
| WO | 2019-053486 A1 | 3/2019 |

OTHER PUBLICATIONS

Secure Kalman Filter State Estimation by Partially Homomorphic Encryption, by Wu et al.; published 2018 (Year: 2018).*
(Continued)

*Primary Examiner* — Vu V Tran
(74) *Attorney, Agent, or Firm* — United One Law Group LLC; Kongsik Kim; Jhongwoo Peck

(57) ABSTRACT

A computer-implemented method is provided for processing dynamic data in the environment comprising a device to be controlled, a controller generating a control command (u(t)), a decryption module which decrypting an encrypted control command received from the controller, an actuator which operates according to the decrypted control command received from the decryption module, a sensor which detects the output (y(t)) of the device and a homomorphic encryption module which homomorphically encrypts the signal of the sensor. The method of the present disclosure comprises transforming, by the controller, the state-space representation of the controller "x(t+1)=Fx(t)+Gy(t), u(t)=Hx(t)+Jy(t)" into "$\bar{z}_1(t+1) = T_1(F_{11} - R_1 H_1)T_1^{-1}\bar{z}_1(t) + \left\lceil \frac{T_1(G_1 - R_1 J)}{s} \right\rceil Enc\left(\left\lceil \frac{y(t)}{r} \right\rceil\right) + \left\lceil \frac{T_1 R_1}{s} \right\rceil Enc\left(\left\lceil \frac{u(t)}{r} \right\rceil\right)$"($z_1 = T_1 w_1$;

(Continued)

1/s is larger than 1; r is larger than zero; $w_1$ is a variable of the state-space representation of the controller after Kalman observable decomposition is carried out to the original state-space representation of the controller); and calculating, by the controller, $R_1$ and $T_1$ which makes $T_1(F_{11}-R_1H_1)T_1^{-1}$ an integer matrix.

5 Claims, 3 Drawing Sheets

(56) References Cited

U.S. PATENT DOCUMENTS

| | | | |
|---|---|---|---|
| 10,715,309 | B2 | 7/2020 | Khedr et al. |
| 2018/0294950 | A1* | 10/2018 | Khedr ............... H04L 9/008 |
| 2019/0222412 | A1 | 7/2019 | Khedr et al. |
| 2019/0268135 | A1 | 8/2019 | Khedr et al. |
| 2019/0334547 | A1* | 10/2019 | van Schuppen .... H03M 7/3057 |

OTHER PUBLICATIONS

Cheon, J-H. et al., "Need for Controllers Having Interger Coefficients in Homomorphically Encrypted Dynamic System," IEEE, 2018 IEEE Conference on Decision and Control (CDC), 7 pages.

Mitra, A. et al., "Secure Distributed Observers for a Class of Linear Time Invariant Systems in the Presence of Byzantine Adersaries," 2016 IEEE 55th Conference on Decision and Control (CDC) 7 pages.

Murguia, C., "Secure and Private Implementation of Dynamic Controllers Using Semi-Homomorphic Encryption," IEEE Transactions on Automatic Control, vol. 65(9): 3950-3957 (2020).

Kogiso, K. et al., "Cyber-Security Enchancements of networked control systems using homomorphic encryption," 2015 54th IEEE Conference on Decision and Control (CDC) Dec. 15-18, 2015, 9 pages.

* cited by examiner

METHOD FOR DYNAMIC FEEDBACK CONTROL BASED ON HOMOMORPHIC ENCRYPTION WHICH CARRIES OUT UNLIMITED ARITHMETIC OPERATIONS WITHOUT BOOTSTRAPPING

CROSS-REFERENCE TO RELATED APPLICATION

This application is a continuation-in-part application of International Application No. PCT/KR2020/008097 filed on Jun. 23, 2020, which claims priority to Korean Application No. 10-2019-0125503 filed on Oct. 10, 2019. The aforementioned applications are incorporated herein by reference in their entireties.

TECHNICAL FIELD

The present disclosure relates to a method for processing homomorphically-encrypted dynamic data, more particularly to a method for dynamic feedback control based on homomorphic encryption, which carries out unlimited arithmetic operations to the homomorphic ally-encrypted data without bootstrapping.

BACKGROUND

As physical systems are connected to computers through network communications, real control system can be a target of cyber attackers. The integration of computation (cyber part), physical system (physical part), and communication (link between cyber and physical parts) is called cyber-physical systems (CPS s).

By its openness and connectivity nature, CPS is vulnerable to malicious attacks. Failure or malfunction of the critical infrastructure such as power plants caused by cyber-physical attacks leads to a tremendous catastrophe.

It can be considered to encrypt a control data for defending the cyber-physical system from the attacks. However, the controller processing the encrypted data has to decrypt the received data in order to generate a control signal.

Further, the controller should keep the secret key for decryption, which can be stolen by attackers. Thus, the security is still threatened even in the control system which encrypts data.

EP 2 677 680 A1 published on Dec. 25, 2013 discloses a technique that homomorphic encryption (hereinafter referred to as "HE") is carried out to control data and arithmetic operations are carried out to the encrypted control data. However, noise increases as the number of computations of the HE control data increases. The scaling factor (proportional integer) is accumulated in the process of transforming real number into integer. Thus, finally, arithmetic operation becomes impossible. In order to resolve the situation, bootstrapping (re-booting) should be carried out. However, the encrypted state variables cannot be updated during the bootstrapping, thereby stopping the controller during the bootstrapping.

Korean Patent No. 10-1919940 published on Nov. 19, 2018 discloses a method for updating homomorphically-encrypted state variables even during bootstrapping. According to the patent, while one of the multiple controllers carries out the bootstrapping, the other controllers update the encrypted state variables. However, the technology accompanies high cost and increases complexity since multiple controllers are introduced. Further, the technology still needs re-booting, thereby increasing operation time.

SUMMARY

The object of the present disclosure is to provide a method for processing dynamic data, which carries out unlimited arithmetic operations to a homomorphic cyphertext without bootstrapping.

The present disclosure provides a computer-implemented method for processing dynamic data in the environment comprising a device to be controlled, a controller generating a control command (u(t)), a decryption module which decrypting an encrypted control command received from the controller, an actuator which operates according to the decrypted control command received from the decryption module, a sensor which detects the output (y(t)) of the device and a homomorphic encryption module which homomorphically encrypts the signal of the sensor. The method of the present disclosure comprises, carrying out, by the controller, transforming the state-space representation of the controller "x(t+1)=Fx(t)+Gy(t), u(t)=Hx(t)+Jy(t)" into $$\bar{z}_1(t+1) = T_1(F_{11} - R_1H_1)T_1^{-1}\bar{z}_1(t) + \left\lceil \frac{T_1(G_1 - R_1J)}{s} \right\rceil Enc\left(\left\lceil \frac{y(t)}{r} \right\rceil\right) + \left\lceil \frac{T_1R_1}{s} \right\rceil Enc\left(\left\lceil \frac{u(t)}{r} \right\rceil\right)"(z_1 = T_1w_1;$$

1/s is larger than 1; r is larger than zero; $w_1$ is a variable of the state-space representation of the controller after Kalman observable decomposition is carried out to the original state-space representation of the controller); and calculating, by the controller, $R_1$ and $T_1$ which makes $T_1(F_{11}-R_1H_1)T_1^{-1}$ an integer matrix. Calculating $R_1$ and $T_1$ comprises calculating the eigenvalues of $F_{11}$ as $\lambda_1, \ldots, \lambda_{m_1}, \sigma_1 \pm i\omega_1, \ldots, \sigma_{m_2} \pm i\omega_{m_2}$; calculating $R_1$ through pole placement method, $R_1$ making the eigenvalues of "$F_{11}-R_1H_1$" equal to $\lceil\lambda_1\rceil, \ldots, \lceil\lambda_{m_1}\rceil, \lceil\sigma_1\rceil \pm i\lceil\omega_1\rceil, \ldots, \lceil\sigma_{m_2}\rceil \pm i\lceil\omega_{m_2}\rceil$; calculating $T_1$ which transforms $F_{11}-R_1H_1$ into a modal canonical form; and reflecting the calculated integer matrix $T_1(F_{11}-R_1H_1)T_1^{-1}$ as the state matrix of the transformed state-space representation of the controller.

The method of the present disclosure can further comprise receiving, by the controller, an encrypted control command (Enc(u(t))) from the actuator.

According to the present disclosure, $$\left\lceil \frac{T_1(G_1 - R_1J)}{s} \right\rceil Enc\left(\left\lceil \frac{y(t)}{r} \right\rceil\right)$$

is calculated from the encrypted output (Enc(y(t))) received from the sensor; and $$\left\lceil \frac{T_1R_1}{s} \right\rceil Enc\left(\left\lceil \frac{u(t)}{r} \right\rceil\right)$$

is calculated from the encrypted control command (Enc(u(t))) received from the actuator.

The present disclosure can be embodied in a computer-implemented system comprising one or more processors and one or more computer readable storage media storing computer-executable instructions that, when executed, cause the one or more processors to perform the method of the present disclosure.

The present disclosure can be embodied in a computer program product comprising one or more computer-readable storage media and program instructions stored at least one of the storage media, which are executable by a processor to cause the processor to perform a method.

Figure 1:
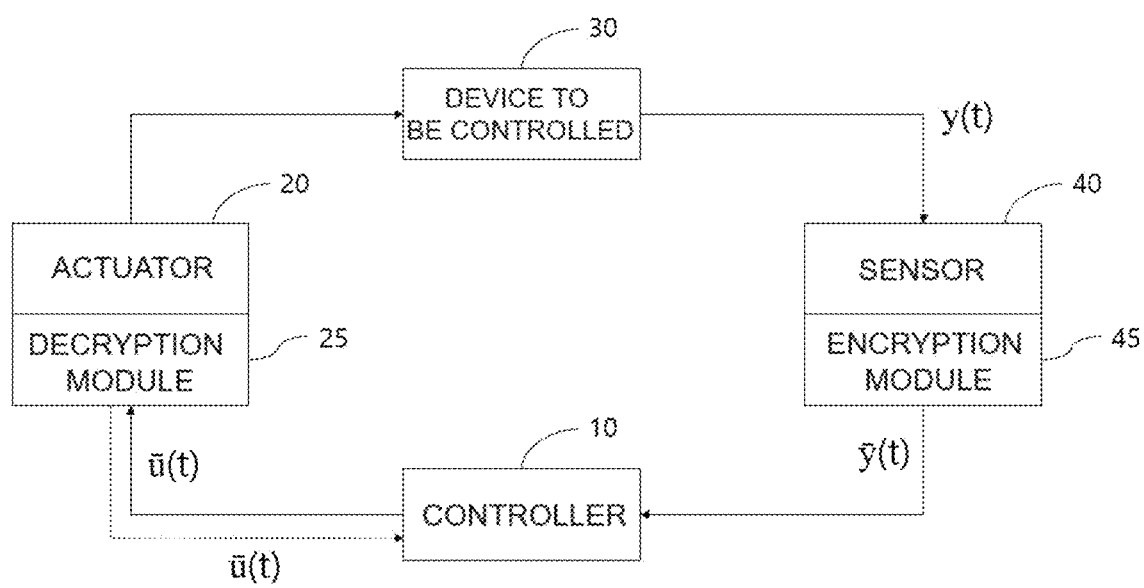
FIG. 1 is an exemplary block diagram of the environment where the method for processing dynamic data according to the present disclosure is carried out.
Figure 2:
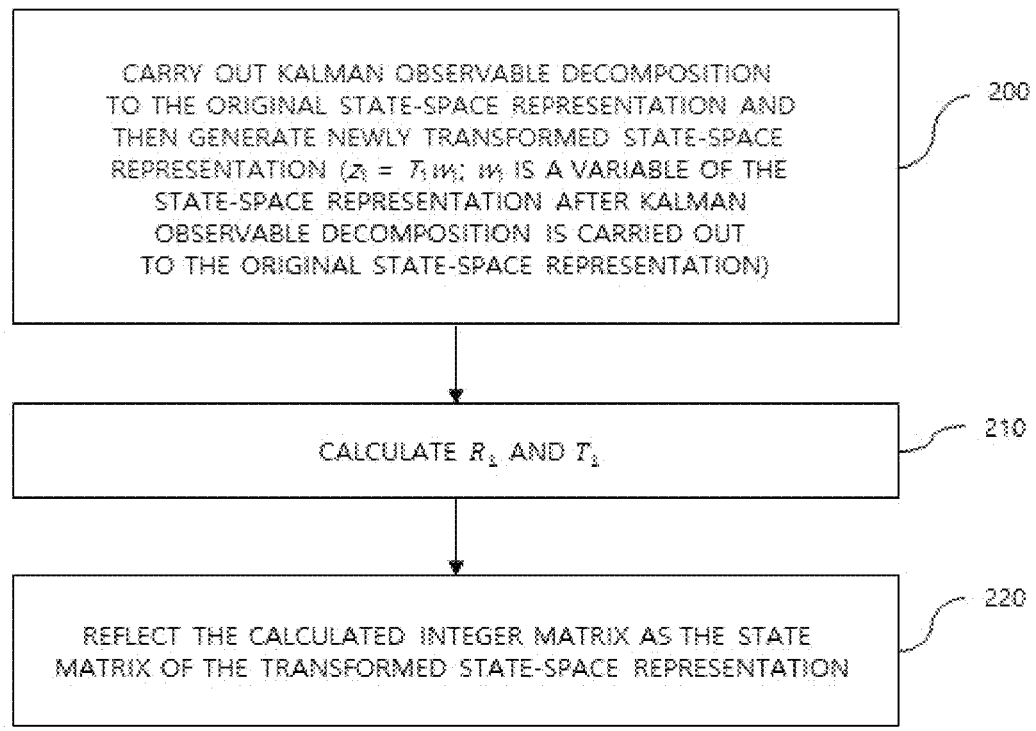
FIG. 2 is a flow chart of the method for processing dynamic data according to the present disclosure.

It should be understood that the above-referenced drawings are not necessarily to scale, presenting a somewhat simplified representation of various preferred features illustrative of the basic principles of the disclosure. The specific design features of the present disclosure will be determined in part by the particular intended application and use environment.

DETAILED DESCRIPTION

Hereinafter, the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

In this specification, the order of each step should be understood in a non-limited manner unless a preceding step must be performed logically and temporally before a following step. That is, except for the exceptional cases as described above, although a process described as a following step is preceded by a process described as a preceding step, it does not affect the nature of the present disclosure, and the scope of rights should be defined regardless of the order of the steps. In addition, in this specification, "A or B" is defined not only as selectively referring to either A or B, but also as including both A and B. In addition, in this specification, the term "comprise" has a meaning of further including other components in addition to the components listed.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The term "coupled" denotes a physical relationship between two components whereby the components are either directly connected to one another or indirectly connected via one or more intermediary components. Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

The term "module" or "unit" means a logical combination of a universal hardware and a software carrying out required function.

In this specification, the essential elements for the present disclosure will be described and the non-essential elements may not be described. However, the scope of the present disclosure should not be limited to the invention including only the described components. Further, it should be understood that the invention which includes additional element or does not have non-essential elements can be within the scope of the present disclosure.

In this specification, "dynamic data" is defined as data which has no value or significantly reduced value if it is not processed within a certain period of time. Control data, streaming data and the like are examples of dynamic data. Further, "dynamic controller" is defined as a controller where a state variable therein is updated every operation time.

The term "value" described in this specification is defined as being universal value which includes vector, matrix, tensor and polynomial as well as scholar value.

In this specification, the encryption of a specific value includes the encryption of a value derived from the specific value.

In this specification, it is assumed that the controller (10) is a discrete-time linear time-invariant controller. However, a person skilled in the arts can apply the present disclosure to the other type of linear controller or a time-variant controller without significant difficulties.

In this specification, Dec(*) means a decrypted value of * and Enc(*) means a homomorphically-encrypted value of *. $\overline{*}$ means a homomorphically-encrypted value of *.

In this specification, $\lfloor * \rceil$ means a rounded value of *.

FIG. 1 is an exemplary block diagram of the environment where the method for processing dynamic data according to the present disclosure is carried out.

The environment comprises a controller (10), an actuator (20), a decryption module (25), a device to be controlled, a sensor (40) and an encryption module (45).

The controller (10), the decryption module (25), the encryption module (45) and the like which carries out the method of the present disclosure can be an electronic arithmetic device.

The electronic arithmetic device can be a device such as a computer, tablet, mobile phone, portable computing device, stationary computing device, server computer etc. Additionally, it is understood that one or more various methods, or aspects thereof, may be executed by at least one processor. The processor may be implemented on a computer, tablet, mobile device, portable computing device, etc. A memory configured to store program instructions may also be implemented in the device(s), in which case the processor is specifically programmed to execute the stored program instructions to perform one or more processes, which are described further below. Moreover, it is understood that the below information, methods, etc. may be executed by a computer, tablet, mobile device, portable computing device, etc. including the processor, in conjunction with one or more additional components, as described in detail below. Furthermore, control logic may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Figure 3:
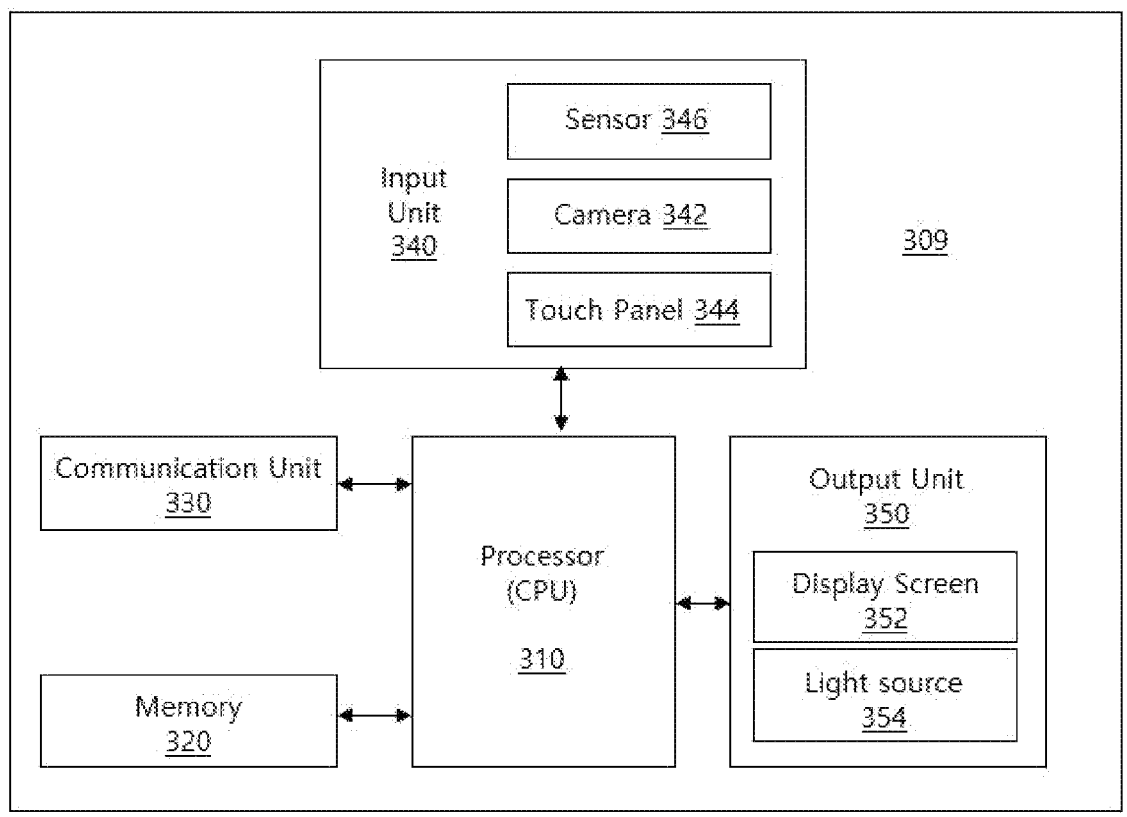
FIG. 3 illustrates an exemplary block diagram of electronic arithmetic device carrying out the present disclosure.

A variety of devices can be used herein. FIG. 3 illustrates an example diagrammatic view of an exemplary device architecture according to embodiments of the present disclosure. As shown in FIG. 3, a device (309) may contain multiple components, including, but not limited to, a processor (e.g., central processing unit (CPU); 310), a memory (320; also referred to as "computer-readable storage media"), a wired or wireless communication unit (330), one or more input units (340), and one or more output units (350). It should be noted that the architecture depicted in FIG. 3 is simplified and provided merely for demonstration purposes. The architecture of the device (309) can be modified in any suitable manner as would be understood by a person having ordinary skill in the art, in accordance with the present claims. Moreover, the components of the device (309) themselves may be modified in any suitable manner as would be understood by a person having ordinary skill in the art, in accordance with the present claims. Therefore, the device architecture depicted in FIG. 3 should be treated as exemplary only and should not be treated as limiting the scope of the present disclosure.

The processor (310) is capable of controlling operation of the device (309). More specifically, the processor (310) may be operable to control and interact with multiple components installed in the device (309), as shown in FIG. 3. For instance, the memory (320) can store program instructions that are executable by the processor (310) and data. The process described herein may be stored in the form of program instructions in the memory (320) for execution by the processor (310). The communication unit (330) can allow the device (309) to transmit data to and receive data from one or more external devices via a communication network. The input unit (340) can enable the device (309) to receive input of various types, such as audio/visual input, user input, data input, and the like. To this end, the input unit (340) may be composed of multiple input devices for accepting input of various types, including, for instance, one or more cameras (342; i.e., an "image acquisition unit"), touch panel (344), microphone (not shown), sensors (346), keyboards, mice, one or more buttons or switches (not shown), and so forth. The term "image acquisition unit," as used herein, may refer to the camera (342), but is not limited thereto. The input devices included in the input (340) may be manipulated by a user. The output unit (350) can display information on the display screen (352) for a user to view. The display screen (352) can also be configured to accept one or more inputs, such as a user tapping or pressing the screen (352), through a variety of mechanisms known in the art. The output unit (350) may further include a light source (354). The device (309) is illustrated as a single component, but the device may also be composed of multiple, separate components that are connected together and interact with each other during use.

In FIG. 1, the actuator (20) and the decryption module (25) are illustrated as being separate from each other but they can be incorporated as an integral element. Further, the sensor (40) and the encryption module (45) are illustrated as being separate from each other but they can be incorporated as an integral element. At least one of the decryption module (25) and the encryption module (45) can be incorporated to the controller (10).

The decryption and the encryption can be carried out according to a symmetric key scheme or a public key scheme. If the symmetric key scheme is used, the decryption module (25) and the encryption module (45) have the same key. If the public key scheme is used, the decryption module (25) can have a secret key and the encryption module (45) can have a public key.

The actuator (20) actuates the device (30) according to the command (u(t)) generated by the controller (10). The sensor (40) detects the output of the device (30). The encryption module (45) encrypts the signal "y(t)" which is detected by the sensor (40). The encrypted value "y(t)" is transmitted to the controller (10). The decryption module (25) decrypts the output "u(t)" of the controller (10) and the decrypted value is transmitted to the actuator (20). The decrypted value is re-encrypted and then the re-encrypted value is returned to the controller (10).

The state-space representation of the control system of the present disclosure can be defined as follows:

$$x(t+1)=Fx(t)+Gy(t)$$

$$u(t)=Hx(t)+Jy(t) \quad \text{[Mathematical Equation 1]}$$

It is assumed that the matrices F, G, H, and J are real number matrices.

It is assumed that the homomorphic encryption system of the control system according to the present disclosure is represented as follows:

Plain text space: $\mathbb{Z}_N$ (set of integers modulo N, where N is a natural number)

Ciphertext space: $\mathcal{C}$

A homomorphic encryption system is called an additively homomorphic system if Dec $(\text{Enc}(m_1) \cdot \text{Enc}(m_2))=m_1+m_2$ when $m_1 \in \mathbb{Z}_N$; $m_2 \in \mathbb{Z}_N$, where $$+: \mathcal{C} \times \mathcal{C} \to \mathcal{C}$$

is an operation over ciphertexts.

The arithmetic operation of an integer matrix "K" and an encryption matrix "c" can be shown as follows when Enc: $\mathbb{Z}_N^n \to C^n$; $Dec: C^n \to \mathbb{Z}_N^n$; and $C^n \times C^n \to C^n$:

[Mathematical Equation 2]

$$K \cdot c = \begin{bmatrix} k_{11} & \cdots & k_{1n} \\ \vdots & \ddots & \vdots \\ k_{m1} & \cdots & k_{mn} \end{bmatrix} \cdot \begin{bmatrix} c_1 \\ \vdots \\ c_n \end{bmatrix} := \begin{bmatrix} k_{11} \cdot c_1 \\ \vdots \\ k_{m1} \cdot c_1 \end{bmatrix} + \cdots + \begin{bmatrix} k_{1n} \cdot c_1 \\ \vdots \\ k_{mn} \cdot c_n \end{bmatrix}$$

That is, $Dec(K \cdot Enc(m)) = Km$. In this equation, $K \in \mathbb{Z}^{m \times n}$; $m \in \mathbb{Z}_N^n$.

The encryption and the decryption of the input and output of a static controller are explained in the following:

Input of the actuator: $u(t) \in \mathbb{R}^m$

Output of the device to be controlled: $y(t) \in \mathbb{R}^p$ $$u(t) = Dy(t) \qquad \text{[Mathematical Equation 3]}$$

The plaintext space "$\mathbb{Z}_N$" is defined as follows:

$$\mathbb{Z}_N = \left\{ i \in \mathbb{Z} : -\frac{N}{2} \leq i < \frac{N}{2} \right\}$$

The ciphertext of Mathematical Equation 3 can be integerized by using a scaling factor "1/s" and a resolution "r" as follows:

[Mathematical Equation 4]

$$\overline{u}(t) = \left\lceil \frac{D}{s} \right\rceil \cdot Enc\left(\left\lceil \frac{y(t)}{r} \right\rceil\right)$$

In this equation, 1/s is not less than 1 and r is larger than zero.

The following relationship can be satisfied for the sufficiently large 1/s and 1/r if $$\left\| \frac{y(t)}{r} \right\|_\infty < \frac{N}{2} \text{ and } \left\| \frac{u(t)}{rs} \right\|_\infty < \frac{N}{2}.$$

$$rs \cdot Dec(\overline{u}(t)) \approx u(t) \qquad \text{[Mathematical Equation 5]}$$

If the state matrix "F" is integerized by using the scaling factor and the resolution as mentioned in the above for a dynamic controller, the scaling factor is accumulated as the arithmetic operation is carried out to homomorphically-encrypted data, thereby making further operation impossible after a certain amount of time has elapsed. This is because the state variable x(t) in the controller does not disappear after the operation but is used in the next operation while remaining in the controller. However, the scaling factor does not accumulate in y(t) and u(t) because the variables are newly generated whenever the operation is carried out.

According to the present disclosure, the state matrix "F" can be integerized without using a scaling factor, thereby making unlimited operation of homomorphic ciphertext possible. The detailed explanation of the present disclosure will be followed.

The state-space representation of Mathematical Equation 1 can be transformed by use of coordinate transform matrix T(z=Tx) as follows:

$$z(t+1) = TFT^{-1}z(t) + TGy(t) \qquad \text{[Mathematical Equation 6]}$$

Mathematical Equation 6 can be transformed by use of u(t) of Mathematical Equation 1, the scaling factor (1/s) and the resolution (r) as follows:

[Mathematical Equation 7]

$$\overline{z}(t+1) = T(F - RH)T^{-1}\overline{z}(t) + \left\lceil \frac{T(G - RJ)}{s} \right\rceil Enc\left(\left\lceil \frac{y(t)}{r} \right\rceil\right) + \left\lceil \frac{TR}{s} \right\rceil Enc\left(\left\lceil \frac{u(t)}{r} \right\rceil\right)$$

Encrypted variables are used for easy explanation in Mathematical Equation 7. The equation of the ciphertext can be represented as the same form of the equation of the plaintext due to the characteristic of homomorphic encryption.

The controller (10) receives Enc(u(t)) from the actuator (20) as illustrated in FIG. 1. The controller (10) and the actuator (20) can be implemented to enable two-way communication with each other. The actuator (20) receives the encrypted control command Enc(u(t)) from the controller (10); decrypts Enc(u(t)) to generate u(t); actuates the device (30) with u(t); re-encrypts u(t) to generate Enc(u(t)); and then return Enc(u(t)) to the controller. The controller (10) receives Enc(y(t)) from the encryption module (45).

The object of the present disclosure is to find the coordinate transform matrix "T" and the matrix "R" to integerize "$T(F-RH)T^{-1}$." The detailed process for finding the matrices to integerize "$T(F-RH)T^{-1}$" will be described.

First, Kalman observable decomposition is carried out to the original state-space representation of the controller (10).

The state-space representation of the controller (10) can be transformed by the Kalman observable decomposition as follows:

[Mathematical Equation 8]

$$w_1(t+1) = F_{11}w_1(t) + G_1y(t) \qquad (8a)$$

$$w_2(t+1) = F_{21}w_1(t) + F_{22}w_2(t) + G_2y(t) \qquad (8b)$$

$$u(t) = H_1w_1(t) + Jy(t) \qquad (8c)$$

The controller of the transformed state-space representation of Mathematical Equation 8 guarantees the following:

($F_{11}$, $H_1$) is observable.

The performance of the controller of the state-space representation of Mathematical Equation 8 is completely identical to that of the controller of the state-space representation of Mathematical Equation 1.

If (F, H) is observable, Mathematical Equation (8b) does not appear after Kalman observable decomposition is carried out.

In the step (200), Mathematical Equation 8a can be transformed by introducing a coordinate transform matrix $T_1$ ($z_1=T_1 w_1$) and a scaling factor ($1/s$) and a resolution ($r$) as follows:

[Mathematical Equation 9]

$$\bar{z}_1(t+1) = T_1(F_{11} - R_1 H_1)T_1^{-1}\bar{z}_1(t) + \left\lceil \frac{T_1(G_1 - R_1 J)}{s}\right\rceil Enc\left(\left\lceil \frac{y(t)}{r}\right\rceil\right) + \left\lceil \frac{T_1 R_1}{s}\right\rceil Enc\left(\left\lceil \frac{u(t)}{r}\right\rceil\right)$$

The object of the present disclosure becomes to find $T_1$ and $R_1$ to integerize "$T_1(F_{11}-R_1 H_1)T_1^{-1}$." The dimension of $T_1$ and $R_1$ is smaller than that of $T$ and $R$ because Kalman observable decomposition is carried out.

$F_{11}$, $G_1$ and $H_1$ can be calculated according to Kalman observable decomposition as follows:

The transformation matrix which transforms the state matrix $F(\in \mathbb{R}^{n\times n})$ by Kalman observable decomposition is defined as "$W=[W_1^T, W_2^T]^T$."

Let the base of the solution group space (dimension: $n_2$) of the systems of equations "$[H^T, (HF)^T, (HF^2)^T, \ldots, (HF^{n-1})^T]^T v=0$ (vector $v\in\mathbb{R}^n$)" be $\{b_1, b_2, \ldots, b_{n_2}\}$. Further, let the base extended to the whole space of $\mathbb{R}^n$ be $\{b_1, b_2, \ldots, b_{n_2}, a_1, a_2, \ldots a_{n_1}\}$. Here, $n=n_1+n_2$.

Matrices $U_1$ and $U_2$ are defined as follows:

$$U_1=[a_1,a_2,a_n]; U_2=[b_1,b_2,\ldots,b_{n_2}]$$

Then, the following relationship is satisfied:

$$W=[W_1^T, W_2^T]^T=[U_1 U_2]^{-1}$$

Therefore, the transformation matrix which transforms the state matrix "$F$" by Kalman observable decomposition is calculated.

Then, $F_{11}$, $G_1$ and $H_1$ are calculated as follows:

$$F_{11}=W_1 F U_1; G_1=W_1 G; H_1=H U_1$$

It is assumed that $F_{11}$ ($F_{11}\in\mathbb{R}^{n_1\times n_1}$) has $m_1$ real eigenvalues and $2m_2$ ($=n_1-m_1$) complex eigenvalues as follows:

$$eig(F_{11})=\lambda_1,\ldots,\lambda_{m_1},\sigma_1\pm i\omega_1,\ldots,\sigma_{m_2}\pm i\omega_{m_2}$$

In the step (210), $T_1$ and $R_1$ are calculated.

First, $R_1$ which satisfies the following condition is calculated:

$$eig(F_{11}-R_1 H_1)=\lceil\lambda_1\rfloor,\ldots,\lceil\lambda_{m_1}\rfloor,\lceil\sigma_1\rfloor\pm i\lceil\omega_1\rfloor,\ldots,\lceil\sigma_{m_2}\rfloor\pm i\lceil\omega_{m_2}\rfloor$$

$R_1$ can be calculated by use of pole placement method. Pole placement method is specifically described in the following:

Chen, Chi-Tsong, and Chi-Tsong Chen. Linear system theory and design. Vol. 301. New York: Holt, Rinehart and Winston, 1984.

The calculation of $R_1$ is described in the below.

It is assumed that the output of the controller is a single output, i.e., $u(t)\in\mathbb{R}^m$ ($m=1$).

According to Kalman observable decomposition, ($F_{11}$, $H_1$) is observable. Therefore, the rank of $[H_1^T, (H_1 F_{11})^T, \ldots, (H_1 F_{11}^{n_1-1})^T]$ is $n_1$. It is known under the condition that an invertible matrix $P$ exists and ($F_{11}$, $H_1$) can be transformed to the following observable canonical form.

[Mathematical Equation 10]

$$PF_{11}P^{-1} = \begin{bmatrix} -f_1 & 1 & 0 & \cdots & 0 \\ -f_2 & 0 & 1 & \ddots & \vdots \\ -f_3 & 0 & 0 & \ddots & 0 \\ \vdots & \vdots & \vdots & \ddots & 1 \\ -f_{n_1} & 0 & 0 & \cdots & 0 \end{bmatrix}, H_1 P^{-1} = [1 \ 0 \ \cdots \ 0],$$

The characteristic polynomial of $F_{11}$ can be represented as "$s^{n_1}+f_1 s^{n_1-1}+\ldots f_{n_1-1}s+f_{n_1}$."

The roots of the characteristic polynomial of $F_{11}$ can be represented by $eig(F_{11})=\lambda_1,\ldots,\lambda_{m_1},\sigma_1\pm i\omega_1,\ldots,\sigma_{m_2}\pm i\omega_{m_2}$.

The polynomial, the roots of which are $\lceil\lambda_1\rfloor,\ldots,\lceil\lambda_{m_1}\rfloor,\lceil\sigma_1\rfloor\pm i\lceil\omega_1\rfloor,\ldots,\lceil\sigma_{m_2}\rfloor\pm i\lceil\omega_{m_2}\rfloor$ is represented by "$s^{n_1}+c_1 s^{n_1-1}+\ldots c_{n_1-1}s+c_{n_1}$." Then, according to Mathematical Equation 10, $R_1$ can be calculated as follows:

$$R_1=P^{-1}[c_1-f_1, c_2-f_2, \ldots, c_{n_1}-f_{n_1}]^T$$

For example, $R_1$ can be calculated by the "place" function of MATLAB®.

The eigenvalues of $F_{11}-R_1 H_1$ are identical to that of $P(F_{11}-R_1 H_1)P^{-1}$. The following relationship is satisfied according to the above design.

$$P(F_{11}-R_1 H_1)P^{-1} = PF_{11}P^{-1} - PR_1\cdot H_1 P^{-1} = \begin{bmatrix} -c_1 & 1 & 0 & \cdots & 0 \\ -c_2 & 0 & 1 & \ddots & \vdots \\ -c_3 & 0 & 0 & \ddots & 0 \\ \vdots & \vdots & \vdots & \ddots & 1 \\ -c_{n_1} & 0 & 0 & \cdots & 0 \end{bmatrix},$$

In the next step, $T_1$ which transforms $F_{11}-R_1 H_1$ into a modal canonical form is calculated. The transformed modal canonical form is an integer matrix as follows:

[Mathematical Equation 11]

$$T_1(F_{11} - R_1 H_1)T_1^{-1} = \begin{bmatrix} \lceil\lambda_1\rfloor & & & & & & \\ & \lceil\lambda_2\rfloor & & & & & \\ & & \ddots & & & & \\ & & & \lceil\sigma_1\rfloor & \lceil\omega_1\rfloor & & \\ & & & -\lceil\omega_1\rfloor & \lceil\sigma_1\rfloor & & \\ & & & & & \ddots & \\ & & & & & & \lceil\sigma_{m_2}\rfloor & \lceil\omega_{m_2}\rfloor \\ & & & & & & -\lceil\omega_{m_2}\rfloor & \lceil\sigma_{m_2}\rfloor \end{bmatrix}$$

According to the theory of linear algebra, a matrix which transforms $F_{11}-R_1H_1$ into a modal canonical form (the right side of Mathematical Equation 11) can be represented by the eigenvectors and the generalized eigenvectors of $F_{11}-R_1H_1$. Therefore, Mathematical Equation 9 can be completed by the calculation of $T_1$ according to the theory. For example, $T_1$ can be calculated by the "canon" function of MATLAB®.

The state matrix of Mathematical Equation 9 becomes an integer matrix by $T_1$ and $R_1$; and the scaling factor does not appear in the state matrix. Therefore, the arithmetic operation to homomorphically-encrypted data can be carried out indefinitely without bootstrapping. Further, the state-space representation of Mathematical Equation 9 can be completed by the calculated $T_1$ and $R_1$.

$$\left\lceil \frac{T_1(G_1 - R_1 J)}{s} \right\rceil Enc\left(\left\lceil \frac{y(t)}{r} \right\rceil\right)$$

is calculated from the encrypted output (Enc(y(t)) received from the sensor; and $$\left\lceil \frac{T_1 R_1}{s} \right\rceil Enc\left(\left\lceil \frac{u(t)}{r} \right\rceil\right)$$

is calculated from the encrypted control command (Enc(u(t)) which is re-encrypted by the actuator and is returned from the actuator.

Although the present disclosure has been described with reference to accompanying drawings, the scope of the present disclosure is determined by the claims described below and should not be interpreted as being restricted by the embodiments and/or drawings described above. It should be clearly understood that improvements, changes and modifications of the present disclosure disclosed in the claims and apparent to those skilled in the art also fall within the scope of the present disclosure. Accordingly, this description is to be taken only by way of example and not to otherwise limit the scope of the embodiments herein.

The invention claimed is:

1. A computer-implemented method for processing dynamic data in the environment comprising a device to be controlled, a controller generating a control command (u(t)), a decryption module which decrypting an encrypted control command received from the controller, an actuator which operates according to the decrypted control command received from the decryption module, a sensor which detects the output (y(t)) of the device and an encryption module which homomorphically encrypts the signal of the sensor, the method comprising:

transforming, by the controller, an original state-space representation of the controller "x(t+1)=Fx(t)+Gy(t),u(t)=H x(t)+Jy(t)" into "$\bar{z}_1(t+1) = T_1(F_{11} - R_1 H_1) T_1^{-1} \bar{z}_1(t) +$ $\left\lceil \frac{T_1(G_1 - R_1 J)}{s} \right\rceil Enc\left(\left\lceil \frac{y(t)}{r} \right\rceil\right) + \left\lceil \frac{T_1 R_1}{s} \right\rceil Enc\left(\left\lceil \frac{u(t)}{r} \right\rceil\right)$"

($z_1 T_1 w_1$ 1/s (scaling factor) is larger than 1; r (resolution) is larger than zero; $w_1$ is a variable of the state-space representation of the controller after Kalman observable decomposition is carried out to the original state-space representation of the controller); and calculating, by the controller, $R_1$ and $T_1$ which makes $T_1(F_{11}-R_1H_1)T_1^{-1}$ an integer matrix;

wherein calculating $R_1$ and $T_1$ comprises calculating the eigenvalues of $F_{11}$ as $\lambda_1, \ldots, \lambda_{m_1}, \sigma_1 \pm i\omega_1, \ldots, \sigma_{m_2} \pm i\omega_{m_2}$; calculating $R_1$ through pole placement method, $R_1$ making the eigenvalues of "$F_{11}-R_1H_1$" equal to $\lceil \lambda_1 \rceil, \ldots, \lceil \lambda_{m_1} \rceil, \lceil \sigma_1 \rceil \pm i \lceil \omega_1 \rceil, \ldots, \lceil \sigma_{m_2} \rceil \pm \lceil \omega_{m_2} \rceil$; calculating $T_1$ which transforms $F_{11}-R_1H_1$ into a modal canonical form; and reflecting the calculated integer matrix $T_1(F_{11}-R_1H_1)T_1^{-1}$ as the state matrix of the transformed state-space representation of the controller; and wherein $F_{11}$ and $H_1$ are obtained from $w_1(t+1)=F_{11}w_1(t)+G_1y(t)$ and $u(t)=H_1w_1(t)+Jy(t)$ which are transformed state-space representation of the of the controller, the transformed state-space representation being obtained by carrying out Kalman observable decomposition to the original state-space representation, wherein T1, F11, R1, and H1 are transformation matrices.

2. The method according to claim 1, further comprising, receiving, by the controller, an encrypted control command (Enc(u(t)) from the actuator.

3. The method according to claim 2, wherein $$\left\lceil \frac{T_1(G_1 - R_1 J)}{s} \right\rceil Enc\left(\left\lceil \frac{y(t)}{r} \right\rceil\right)$$

is calculated from the encrypted output (Enc(y(t)) received from the encryption module; and $$\left\lceil \frac{T_1 R_1}{s} \right\rceil Enc\left(\left\lceil \frac{u(t)}{r} \right\rceil\right)$$

is calculated from the encrypted control command (Enc(u(t)) received from the actuator.

4. A computer-implemented system comprising one or more processors and one or more non-transitory computer readable storage media storing computer-executable instructions that, when executed, cause the one or more processors to perform a method comprising:

transforming an original state-space representation of the controller "x(t+1)=Fx(t)+Gy(t), u(t)=Hx(t)+Jy(t)" into "$\bar{z}_1(t+1) = T_1(F_{11} - R_1 H_1) T_1^{-1} \bar{z}_1(t) +$ $\left\lceil \frac{T_1(G_1 - R_1 J)}{s} \right\rceil Enc\left(\left\lceil \frac{y(t)}{r} \right\rceil\right) + \left\lceil \frac{T_1 R_1}{s} \right\rceil Enc\left(\left\lceil \frac{u(t)}{r} \right\rceil\right)$"($z_1 = T_1 w_1$;

1/s (scaling factor) is larger than 1; r (resolution) is larger than zero; $w_1$ is a variable of the state-space representation of the controller after Kalman observable decomposition is carried out to the original state-space representation of the controller); and calculating $R_1$ and $T_1$ which makes $T_1(F_{11}-R_1H_1)T_1^{-1}$ an integer matrix;

wherein calculating $R_1$ and $T_1$ comprises calculating the eigenvalues of $F_{11}$ as $\lambda_1, \ldots, \lambda_{m_1}, \sigma_1 \pm i\omega_1, \ldots, \sigma_{m_2} \pm i\omega_{m_2}$; calculating $R_1$ through pole placement method, $R_1$ making the eigenvalues of "$F_{11}-R_1H_1$" equal to $\lceil \lambda_1 \rceil, \ldots, \lceil \lambda_{m_1} \rceil, \lceil \sigma_1 \rceil \pm i \lceil \omega_1 \rceil, \ldots, \lceil \sigma_{m_2} \rceil \pm i \lceil \omega_{m_2} \rceil$; calculating $T_1$ which transforms $F_{11}-R_1H_1$ into a modal canonical form; and reflecting the calculated integer matrix $T_1(F_{11}-R_1H_1)T_1^{-1}$ as the state matrix of the transformed state-space representation of the controller; and wherein $F_{11}$ and $H_1$ are obtained from $w_1(t+1)=F_{11}w_1(t)+G_1y(t)$ and $u(t)=H_1w_1(t)+Jy(t)$ which are transformed state-space representation of the of the controller, the transformed state-space representation being obtained by carrying out Kalman observable decomposition to the original state-space representation, wherein T1, F11, R1, and H1 are transformation matrices.

5. A computer program product comprising one or more non-transitory computer-readable storage media and program instructions stored at least one of the storage media, the program instructions executable by a processor to cause the processor to perform a method comprising:

transforming an original state-space representation of the controller "$x(t+1)=Fx(t)+Gy(t)$, $u(t)=Hx(t)+Jy(t)$" into "$\bar{z}_1(t+1) = T_1(F_{11} - R_1H_1)T_1^{-1}\bar{z}_1(t) + \left\lceil \frac{T_1(G_1 - R_1J)}{s} \right\rceil Enc\left(\left\lceil \frac{y(t)}{r} \right\rceil\right) + \left\lceil \frac{T_1R_1}{s} \right\rceil Enc\left(\left\lceil \frac{u(t)}{r} \right\rceil\right)$"

($z_1T_1w_1$ 1/s (scaling factor) is larger than 1; r (resolution) is larger than zero; $w_1$ is a variable of the state-space representation of the controller after Kalman observable decomposition is carried out to the original state-space representation of the controller); and calculating $R_1$ and $T_1$ which makes $T_1(F_{11}-R_1H_1)T_1^{-1}$ an integer matrix;

wherein calculating $R_1$ and $T_1$ comprises calculating the eigenvalues of $F_{11}$ as $\lambda_1, \ldots, \lambda_{m_1}, \sigma_1 \pm i\omega_1, \ldots, \sigma_{m_2} \pm i\omega_{m_2}$; calculating $R_1$ through pole placement method, $R_1$ making the eigenvalues of "$F_{11}-R_1H_1$" equal to $\lceil \lambda_1 \rceil, \ldots, \lceil \lambda_{m_1} \rceil, \lceil \sigma_1 \rceil \pm i\lceil \omega_1 \rceil, \ldots, \lceil \sigma_{m_2} \rceil \pm i\lceil \omega_{m_2} \rceil$; calculating $T_1$ which transforms $F_{11}-R_1H_1$ into a modal canonical form; and reflecting the calculated integer matrix $T_1(F_{11}-R_1H_1)T_1^{-1}$ as the state matrix of the transformed state-space representation of the controller; and wherein $F_{11}$ and $H_1$ are obtained from $w_1(t+1)=F_{11}w_1(t)+G_1y(t)$ and $u(t)=H_1w_1(t)+Jy(t)$ which are transformed state-space representation of the of the controller, the transformed state-space representation being obtained by carrying out Kalman observable decomposition to the original state-space representation, wherein T1, F11, R1, and H1 are transformation matrices.

\* \* \* \* \*